UNITED STATES PATENT OFFICE.

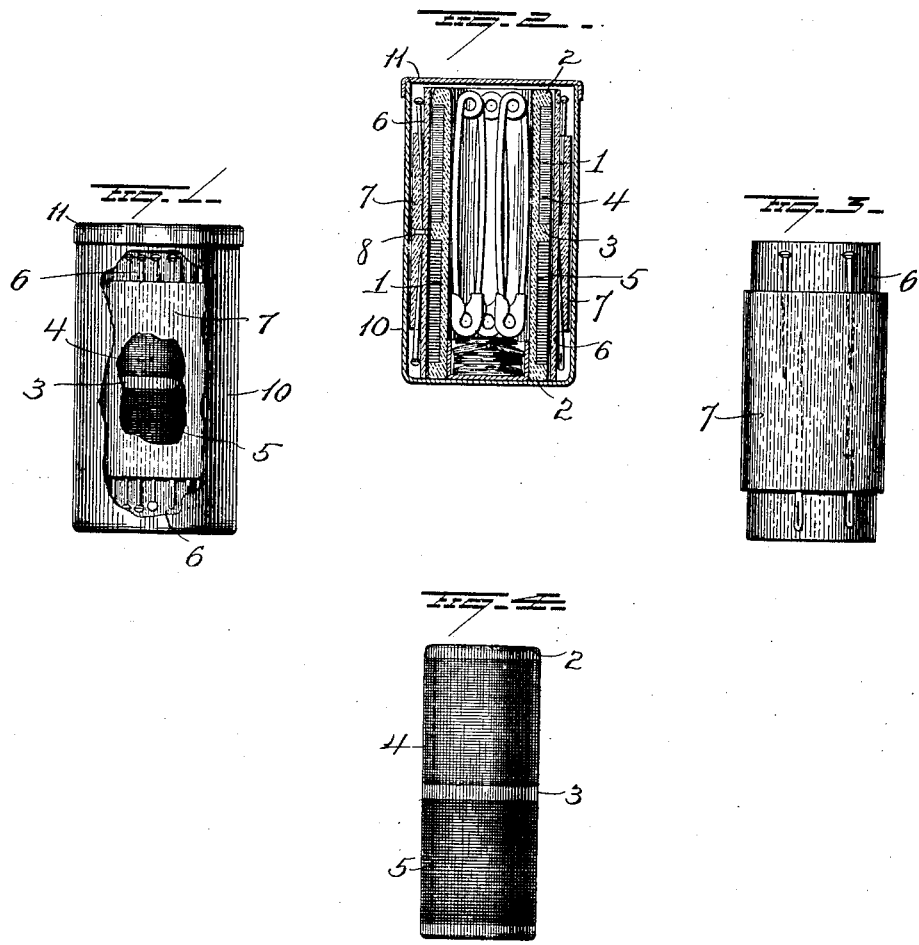

FREDERIC W. HAWKES, OF NEW YORK, N. Y.

IMPLEMENT-HOLDER.

1,340,224.  Specification of Letters Patent.  Patented May 18, 1920.

Application filed October 10, 1917. Serial No. 195,768.

*To all whom it may concern:*

Be it known that I, FREDERIC W. HAWKES, a citizen of the United States, and a resident of New York, in the county of New York and State of New York, have invented certain new and useful Improvements in Implement-Holders; and I do hereby declare the following to be a full, clear, and exact description of the invention, such as will enable others skilled in the art to which it appertains to make and use the same.

This invention relates to improvements in containers for pins, needles, thread, buttons and the like,—the object of the invention being to provide a simple and comparatively cheap device which will occupy small space and serve to conveniently store pins, needles, thread, buttons and similar articles.

With this and other objects in view the invention consists in certain novel features of construction and combinations of parts as hereinafter set forth and pointed out in the claims.

In the accompanying drawings, Figure 1 is a view of the device, partly broken away. Fig. 2 is a sectional view. Fig. 3 is a view of the container removed from the box or receptacle, and Fig. 4 is a detail of the tube which contains thread.

My improved container comprises an inner tube 1 of paper, card-board or other suitable material, having thereon a plurality of circumferential flanges or rings 2, 2, 3, spaced apart so as to provide spool sections 4—5 on which threads of different colors may be wound. In the drawing, I have shown three circumferential flanges or rings forming two spool sections, but it is evident that more than two such sections would be afforded by providing the tube with a greater number of flanges or rings. If desired the intermediate flange or flanges 3 may be made thinner than the end flanges 2 and emergency bandage may be wound between the end flanges 2—2. The bore of the tube 1 serves to contain such articles as safety-pins and buttons and the latter may if desired be contained in a separate box 1ª inserted into said tube.

The spool tube and container 1 is located removably within the inner of two concentric tubes 6—7 and the flanges or rings 2 may have frictional engagement with said inner tube 6 to prevent accidental displacement of these parts. The tubes 6 and 7 may be made of paper, card-board or other yielding or semi-flexible material, and the inner tube 6 may be made equal in length to that of the tube 1. The outer tube 7 is made shorter than the inner tube 6 and may be of the same material as that of the latter. These two tubes 6 and 7 fit closely one within the other and may if desired be secured together intermediate of their ends by means of a suitable fastening device 8. The tubes 6 and 7 provide, between them, receptacles for pins or needles or both which will be held in place by frictional engagement with said tubes as will be readily understood. By making the outer tube 7 shorter than the inner tube 6, the headed ends of the pins or needles will be readily accessible for removal.

The container as above described will be inclosed within a tubular box or receptacle 10 having a suitable cover 11 and will thus be protected from dust and moisture and be conveniently stored.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. An article of manufacture of the character described, comprising a tube having a plurality of spool sections and forming a container for other articles, and separate concentric tubes of yielding material inclosing the first-mentioned tube, said concentric tubes adapted to contact with each other and constitute frictional retaining means for pins or needles inserted between them.

2. An article of manufacture of the character described, comprising a tube having a plurality of circumferential projections forming spool sections between them, two contacting concentric tubes forming frictional retaining means for pins and needles, the inner of said concentric tubes inclosing the first mentioned tube and an inclosing receptacle provided with a cover.

In testimony whereof I have signed this specification in the presence of two subscribing witnesses.

FREDERIC W. HAWKES.

Witnesses:
HENRY NOBBE,
H. G. QUIGLEY.